Nov. 7, 1972  D. A. ARMSTRONG  3,702,207
FLUID PRESSURE PROPORTIONING UNIT
Filed Nov. 10, 1970

INVENTOR.
Daniel A. Armstrong
BY
D. D. McGraw
ATTORNEY

United States Patent Office

3,702,207
Patented Nov. 7, 1972

---

3,702,207
FLUID PRESSURE PROPORTIONING UNIT
Daniel A. Armstrong, Utica, Mich., assignor to General Motors Corporation, Detroit, Mich.
Continuation-in-part of abandoned application Ser. No. 63,365, Aug. 13, 1970. This application Nov. 10, 1970, Ser. No. 88,456
Int. Cl. B60t 8/18
U.S. Cl. 303—22 A     3 Claims

ABSTRACT OF THE DISCLOSURE

A fluid proportioning unit for a motor vehicle braking system in which the pressure output of a valve member operates the front wheel brakes and acts through a lever which is pivoted on a fulcrum mechanism to operate another valve member which controls the rear wheel brakes. The fulcrum mechanism includes a cam having a cam surface constructed so that the point of contact between the cam and the lever migrates across the lever as the lever rotates to progressively decrease the proportion of front brake pressure which is transmitted to the rear brakes in order to compensate for the dynamic weight transfer characteristics of the vehicle. A piston controlled by the pressure in a load leveler system rotates the cam prior to brake actuation to adjust the proportioning unit according to the vehicle static load.

---

This is a continuation-in-part of Ser. No. 63,365 filed Aug. 13, 1970, now abandoned. The invention relates to a fluid pressure proportioning unit and more particularly to a brake pressure proportioning unit which proportions brake pressure between the front and rear brakes according to the vehicle static load and the decelerative weight transfer characteristics of the vehicle.

It is well known that the amount of brake torque which can be applied to a vehicle wheel to obtain optimum braking performance is dependent upon the vehicle load carried by the wheel. The vehicle load carried by the wheel is a function of the static load of the vehicle and the dynamic weight transfer as the vehicle decelerates. The static load on the wheels of any particular vehicle varies according to the weight of the passengers, fuel, and cargo carried by the vehicle. As the vehicle is braked, a portion of this static load is transferred from the rear axle to the front axle. It is desirable therefore, in order to obtain optimum braking performance, to sense the distribution of the vehicle static load between the front and rear axles and proportion the brake pressure accordingly and to progressively decrease the rear brake pressure relative to that applied to the front brakes as the vehicle load shifts to the front axle during deceleration.

As will be shown, a graphical representation of the optimum relationship of the front brake pressure to rear brake pressure during vehicle deceleration is curvilinear in form and varies with the static load carried by the vehicle wheel and with the dynamic load transfer characteristics of that particular vehicle.

The present invention provides a pressure proportioning device which yields a curvilinear relationship of brake pressure between the front and rear brakes which closely approximates the optimum braking effectiveness curve. The proportioning unit includes a cam which is constructed to compensate for the decelerative weight transfer characteristics of a particular vehicle. The pressure from a hydraulic or pneumatic load leveling system senses the vehicle static load carried by the rear axle and modifies the cam to proportion the brake pressure accordingly.

Figure 1:
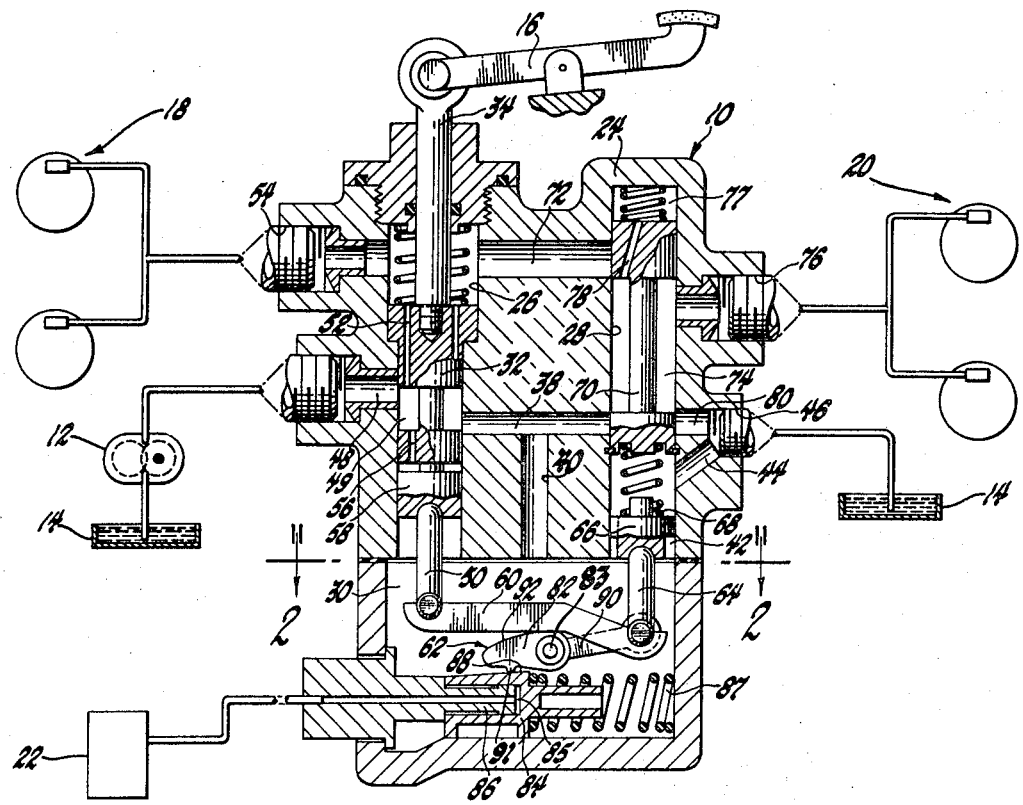
FIG. 1 is a cross sectional view of a fluid pressure proportioning unit adapted for use with an open-center hydraulic full power brake and showing parts broken away and in section.
Figure 2:
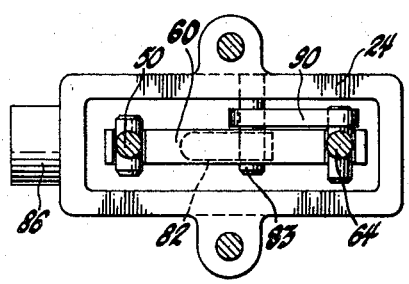
FIG. 2 is a cross sectional view of the fluid pressure proportioning unit of FIG. 1 taken in the direction of arrows 2—2.

Referring to FIG. 1, the brake system includes the hydraulic full power brake and proportioning unit 10, pump 12, sump 14, brake pedal 16, front wheel brakes 18 associated with the front axle, rear wheel brakes 20 associated with the rear axle, and a hydraulic or pneumatic load leveling system 22. Valve housing 24 includes bores 26 and 28 and chamber 30. Valve member 32 is slidably located in the bore 26 and is normally in the position shown in FIG. 1, with hydraulic fluid being communicated from pump 12 to inlet port 48 and through passages 38 and 40, chamber 30, passages 42 and 44, to sump port 46 and sump 14. Valve member 32 is actuable by pedal 16 connected through rod 34 to restrict fluid flow through passage 38 and to further open inlet port 48 communicating an increased volume of hydraulic fluid from pump 12. The resulting pressure increase in the valve chamber 49 is communicated to the front brakes 18 through passage 52 and outlet port 54. Pressure in chamber 49 is communicated through passage 56 to act downward on piston 58 which is slidable in bore 26. The downward movement of piston 58 acts through push rod 50 causing lever 60 to rotate on fulcrum mechanisms 62 which is located in chamber 30. The force applied to lever 60 is transmitted through push rod 64, piston 66, and spring 68 to valve member 70, which is sealingly slidable in bore 28. Upward movement of valve member 70 resulting from rotary movement of lever 60 allows fluid communication from outlet port 54 through passage 72 and valve chamber 74 to outlet port 76 which communicates with rear wheel brakes 20. Fluid pressure is communicated from valve chamber 74 to balance chamber 77 through passage 78 and acts downward on valve member 70 overbalancing the force applied by lever 60 and thereby causing valve member 70 to move downward closing passage 72, opening passage 80 and dumping pressure to sump 14. This servo action regulates valve member 70 and the pressure to rear brake 20.

The proportion of front wheel brake pressure which is communicated to the rear wheel brakes is a function of the proportion of front wheel brake pressure acting on lever 60 which acts upon valve member 70. Therefore, the proportion of front wheel brake pressure which is communicated to the rear wheel brakes is a function of the location of the fulcrum on which lever 60 rotates.

The fulcrum mechanism 62, to be fully described later, is responsive to the static loading of a monitored axle. A load leveling system, indicated generally at 22, provides a fluid pressure which is proportional to the vehicle static loading. Such a load leveler typically consists of a piston and cylinder assembly mounted between the vehicle axle and the body structure and to which pressurized gas or liquid may be added or removed either manually by the vehicle operator or automatically by a vehicle height sensing device in order to obtain the desired inclination of the vehicle body. The fluid within the piston and cylinder assembly is acted upon by and therefore proportional to the vehicle static load carried by that particular axle. The present invention may be used in conjunction with any load leveling system generating a fluid pressure proportional to the static load carried by the axle. Such a load leveling system is typically provided on the rear vehicle axle inasmuch as the static load carried by the rear axle varies by several hundred pounds during normal vehicle use.

Fulcrum mechanism 62 includes cam 82 and piston 84. Piston 84 is slidable on hydraulic cylinder 86 and cooperates therewith to form expansible chamber 85. Fluid pressure from the load leveling system 22 is communicated to expansible chamber 85 and cooperates with spring 87 to position the piston 84. The upper surface of piston 84 forms an inclined surface 88. Cam 82 is rotatably mounted on pin 83 of valve housing 24 and has an abutment 91 which engages the inclined surface 88 so that the position of piston 84 determines the rotary position of cam 82. Cam 82 has a cam surface 92 on which lever 60 pivots. Link 90 is rotatably mounted on pin 83 of valve housing 24 and on push rod 64 and rotates with lever 60 to prevent lateral shifting of lever 60 on the cam 82.

Figure 3:
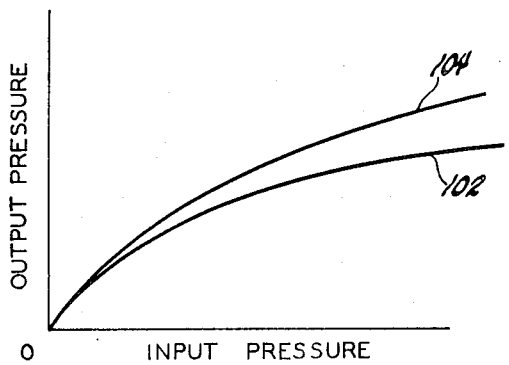
FIG. 3 is a graphical representation of the performance of the hydraulic full power brake and fluid pressure proportioning unit of FIG. 1.

Referring to FIG. 3, a graphical representation of valve input pressure (front brake pressure) versus valve output pressure (rear brake pressure), the ideal pressure for a vehicle carrying the minimum load is represented by curve 102.

FIG. 1 shows the hydraulic full power brake and proportioning unit 10 in the brakes released phase of operation. Piston 84 is shown located by the pressure generated in the load levelers 22 with a minimum vehicle static load. Upon brake pedal actuation by the vehicle operator, the pressure build-up in valve chamber 49 acts on piston 58 causing lever 60 to rotate on fulcrum mechanism 62. As the vehicle decelerates, weight is transferred from the rear axle to the front axle causing a pressure decrease in the load leveling system 22. Piston 84 cannot move leftward as the load leveler pressure decreases since the braking force applied to lever 60 and cam 82 holds the piston in place.

The cam surface 92 of cam 82 is constructed so that as lever 60 rotates as the pressure is valve chamber 49 increases, the point of contact between the lever 60 and the cam 82 migrates across the lever 60 towards push rod 50. This progressive migration of the fulcrum point toward push rod 50 as the brakes are applied reduces the mechanical advantage of lever 60 so that a progressively smaller amount of front brake pressure acts upon valve member 70. In this manner the optimum brake performance curve 102 for a vehicle carrying a minimum static load can be very closely approximated.

Referring again to FIG. 3, the curve 104 graphically represents the ideal pressure proportioning for vehicle load to the maximum weight. It is noted that the greater static load on the rear wheels of the heavily loaded vehicle permits a greater proportion of front brake pressure to be maintained at the rear wheel brakes during deceleration for optimum braking effectiveness.

The maximum static weight of the vehicle generates a pressure on the load levelers 22 which locates the piston 84 rightwardly of its position shown in FIG. 1. This rotates cam 82 to a position presenting a profile more nearly arcuate about the pivot center of the cam so that the initial migration of the fulcrum point toward push rod 50 is at a slower rate than that experienced with the minimum vehicle load. The brake pressure is thereby proportioned to very closely approximate the ideal maximum load curve 104. The proportioning unit is of course effective throughout the entire range of vehicle static loads between the minimum and maximum curves 102 and 104.

While the invention is herein shown and described as applied to an open-center hydraulic full power brake, it is within the scope of this invention that other types of valve units or hydraulic power generators could be used. For example, the load sensitive fulcrum mechanism of this invention could be used in conjunction with a master cylinder assembly having a lever connecting separate fluid pressure generating cylinders for the front and rear wheel brakes.

What is claimed is:

1. In a vehicle having front and rear axles effective under varying static load conditions to impose differing loads on the front and rear wheels respectively associated therewith, and front and rear wheel brakes respectively associated with said front and rear wheels, the combination of:

a first member actuable in accord with force imposed thereon to impart braking effort to said front wheel brakes;

a second member actuable in accord with force imposed thereon to impart braking effort to said rear wheel brakes;

operator controlled means effective to impart brake actuating force to one of said members whereby braking effort is imparted to the wheel brakes associated with one of said axles;

a ramp member being movable and having an inclined surface;

means monitoring the load condition of the other of said axles and adated to move said ramp member accordingly;

a cam member having a cam surface and being rotatably mounted, said cam member engaging said inclined surface of said ramp member so that movement of said ramp member rotates said cam; and a lever engaging said cam surface and being turned thereon in accord with braking effort imparted to the wheel brakes controlled by the one of said members actuated by said operator controlled means to impose force on the other of said members, said cam surface being constructed so that upon rotary movement of said lever the point of engagement of said lever on said cam surface migrates upon said lever to establish a variable lever arm whereby the braking effort is proportioned between the front and rear wheel brakes.

2. In a vehicle having front and rear axles effective under varying static load conditions to impose differing loads on the front and rear wheels respectively associated therewith, and front and rear wheel brakes respectively associated with said front and rear wheels, the combination of:

a first member actuable in accord with force imposed thereon to impart braking effort to said front wheel brakes;

a second member actuable in accord with force imposed thereon to impart braking effort to said rear wheel brakes;

operator controlled means effective to impart brake actuating force to one of said members whereby braking effort is imparted to the wheel brakes associated with one of said axles;

a ramp member being movable and having an inclined surface;

monitoring means including a fluid pressure operated load leveling system adapted to move said ramp member in accordance with the static load condition of said other of said axles;

a cam member having a cam surface and being rotatably mounted, said cam member engaging said inclined surface of said ramp member so that movement of said ramp member rotates said cam; and a lever engaging said cam surface and being turned thereon in accord with braking effort imparted to the wheel brakes controlled by the one of said members actuated by said operator controlled means to impose force on the other of said members, said cam surface being constructed so that upon rotary movement of said lever the point of engagement of said lever on said cam surface migrates upon said lever to establish a variable lever arm whereby the braking effort is proportioned between the front and rear wheel brakes.

3. In a vehicle having front and rear axles effective under varying static load conditions to impose differing loads on the front and rear wheels respectively associated therewith, front and rear wheel brakes respectively associated with said front and rear wheels, and a fluid pressure operated load leveling system providing a pressure signal proportional to the static load carried by said rear wheel axle, the combination of:

a first member actuable in accord with force imposed thereon to impart braking effort to said front wheel brakes;

a second member actuable in accord with force imposed thereon to impart braking effort to said rear wheel brakes;

operator controlled means effective to impart brake actuating force to said first member;

a lever having a first end actuable in accord with braking effort imparted to said front wheel brakes, a second end imposing force on said second member;

said lever being turned on a fulcrum mechanism establishing variable lever arms relative to said first and second ends of said lever and including:

a piston being rectilinearly movable and having an inclined surface, a cylinder in sealingly slidable engagement with said piston and forming therewith an expansible chamber, fluid conduit means communicating said load leveling system fluid pressure signal to said expansible chamber whereby said piston is positioned, a cam member having a cam surface and being rotatably mounted, said cam member having an abutment located relatively opposite said cam surface, said abutment engaging said inclined surface of said piston so that rectilinear movement of said piston moves said cam rotatably, said lever engaging said cam surface of said cam member and being turned thereon upon actuation of said first member, said cam surface being so constructed that upon rotary movement of said lever the point of engagement of said lever and said cam surface migrates upon said lever to establish a variable lever arm whereby the braking effort is proportioned between the front and rear wheel brakes.

References Cited

UNITED STATES PATENTS

| | | | |
|---|---|---|---|
| 2,361,087 | 10/1944 | Cook | 188—195 |
| 2,490,641 | 12/1949 | Rostu | 188—195 |
| 2,498,438 | 2/1950 | Rostu | 188—195 |
| 3,512,845 | 5/1970 | Farmery et al. | 188—195 X |

FOREIGN PATENTS

| | | | |
|---|---|---|---|
| 943,504 | 12/1963 | Great Britain | 303—22 R |

GEORGE E. A. HALVOSA, Primary Examiner

U.S. Cl. X.R.

188—195, 349; 303—6 C